UNITED STATES PATENT OFFICE.

CHARLES CATLETT, OF STAUNTON, VIRGINIA.

TREATMENT OF POTASSIFEROUS MATERIALS.

1,354,727.  Specification of Letters Patent.  Patented Oct. 5, 1920.

No Drawing.  Application filed September 3, 1918. Serial No. 252,458.

*To all whom it may concern:*

Be it known that I, CHARLES CATLETT, a citizen of the United States, residing at Staunton, in the county of Augusta and State of Virginia, have invented certain new and useful Improvements in Treatment of Potassiferous Materials; and I do hereby declare the following to be a full, clear, and exact description of the invention, such as will enable others skilled in the art to which it appertains to make and use the same.

This invention relates to treatment of potassiferous materials. More particularly it relates to processes of treating potassiferous materials for the purpose of rendering the potash content thereof more available, broadly speaking, and especially to render it more soluble; most desirably also at the same time effecting more or less complete separation of the potash from the treated material by volatilization, and recovering the volatilized potash values.

Many proposals have been advanced heretofore for unlocking or rendering more available for plant food and for other purposes the potash values contained in potassiferous materials, potassiferous minerals particularly, in which potash is naturally present to a great extent in substantially unavailable condition. Typical minerals containing combined potassium (herein broadly termed potash or potash values, in conformity with established usage in the art) are feldspar, leucite, nephelite, glauconite or greensand, and the like, whose potash content is relatively high, while clays and limestones, for example, are representative of materials containing appreciable but small percentages of potash. It has been recognized for a long time that the relatively small percentages of potash commonly contained in the raw materials employed in making Portland cement, in smelting iron in the blast furnace, and in certain other large scale industrial operations, give rise in the aggregate to very large amounts of potash which are volatilized in the kilns or furnaces used and which are carried off in the effluent dust and gases. To a limited extent, and especially in the manufacture of Portland cement, potash in kiln and furnace gases is being recovered commercially; but in spite of the many methods of treatment proposed, the yield of potash from such sources has not attained anything like the proportions of which it should theoretically be capable.

It is well known that most potassiferous materials, if heated alone at sufficiently high temperatures and for a sufficiently long time, will eventually give off most of their potash in volatilized form. But simple heating of a refractory potassiferous mineral alone to drive off potash is a difficult and uneconomical procedure, and it is far better to mix with the mineral some substance which will act as an assistant in potash liberation, in order to enable the use of lower temperatures and shorter heating periods. The history of the development of this art shows that a wide variety of substances have been suggested as desirable to add in varying proportions to potassiferous materials of the character in question for the purpose of reacting upon the same and effecting liberation of the potash content or, in other words of changing the condition thereof so as to render it more available. The use of certain of these substances has proved feasible and profitable under favorable conditions in certain specific industrial operations. In the manufacture of Portland cement, for example, introduction of common salt into the kiln so that it can react upon the cement making materials, as by mixing it with the raw materials fed into the kiln, has been found to materially increase the liberation of potash in the kiln and to otherwise favorably affect the conditions of operation in such manner as to greatly enhance the amount of potash recoverable from the dust and gases leaving the kiln.

A principal object of the present invention is to still further facilitate and simplify liberation of potash from potassiferous materials, and to accomplish this with particular reference to receovery of potash in the manufacture of Portland cement; but it is to be understood that the invention is not in any sense limited to this particular field and that it has to do broadly with liberating potash from potassiferous materials, or rendering the potash content of such materials more readily available, whether or not the operation involves also the separation of such potash from its original environment by volatilization or otherwise.

The invention involves primarily the use, as potash-liberating agents, of a class of compounds never employed heretofore for that purpose, so far as I am aware. According to the present invention, an oxysalt or a material comprising an oxysalt is caused to react upon potassiferous materials under such conditions that their potash content, or a substantial part thereof, is altered as regards its combination form, becoming more readily available, either in the sense that it is more easily assimilated by plants, or in the sense that it is more readily separated by leaching, volatilization, or the like, from the substances accompanying it in said potassiferous materials. In particular, the invention concerns the use of an oxychlorid of calcium as a potash-liberating agent of especially desirable characteristics.

As the employment of my invention in the Portland cement industry is its most important application at the present time, and for the sake of a concrete example, the principles of the invention will be explained more particularly with reference to the recovery of potash as a by-product in the manufacture of Portland cement.

Among other reagents which it has been proposed heretofore to employ in the cement kiln for the purpose of aiding liberation of potash from the cement mix, is calcium chlorid. Although this substance does undoubtedly aid potash liberation to an appreciable extent, and furthermore would appear to be a desirable reagent to employ because of the fact that it aids potash liberation while contributing only lime to the cement clinker produced by the kiln, nevertheless the use of this reagent has never passed much beyond the experimental stage in practice owing to very serious drawbacks to its use in actual operation. On account of the extremely hygroscopic character of calcium chlorid, it is not feasible to attempt its incorporation in solid form with the materials of the raw cement mix; and a concentrated solution of calcium chlorid, such as it is necessary to employ, is extremely inconvenient and disagreeable to handle. In spite of the fact, therefore, that calcium chlorid is theoretically the logical potash-liberating agent to use in this connection, because it reacts with part or all of the potash of the raw mix to produce largely readily volatilized potassium chlorid, while affecting the composition of the clinker only by its addition thereto of lime which can be allowed for in calculating the mix, its use is not generally considered to be practical even though in normal times calcium chlorid is practically a waste material, very cheap and easily obtainable.

According to the present invention, all the theoretically desirable results obtainable by the use of calcium chlorid are obtainable without the necessity of using calcium chlorid itself as an addition to the cement making materials either by direct admixing therewith or by other form of introduction into the kiln. The inconvenient and disagreeable features inherent in the use of calcium chlorid are thus entirely avoided, and in addition some unexpected desirable results are attained.

The oxysalt of calcium, in this instance an oxychlorid of calcium, or more usually and desirably a mixture of oxychlorids of calcium and magnesium more or less intimately associated with hydrated lime and magnesia, employed as liberating agent in the present process, may be prepared in any well known or suitable manner. However, as it is most conveniently and advantageously introduced into the cement kiln in the form of a fine powder admixed with the raw cement materials or otherwise, I consider it most desirable to prepare it by reacting under proper conditions between an excess of lime or hydrate of lime and calcium chlorid in the presence of water, and then to reduce the resultant oxychlorid cement composition to finely divided condition, thus obtaining a novel calcium oxychlorid composition which forms a part of the subject matter of my copending application Serial No. 233,564, filed May 9, 1918 (Patent No. 1,282,188, Oct. 22, 1918). This pulverulent oxychlorid composition, though substantially dry to the touch and substantially stable under normal conditions of exposure to the atmosphere, contains more or less chemically combined water or water of hydration which it retains in part rather tenaciously up to a red heat or thereabout, a fact that renders it especially suitable for present purposes on account of the catalytic or reaction-promoting effect of such moisture in the liberating operation. The oxychlorid composition may be brought into reacting relation in the kiln with the cement making materials in several different ways, each of which has certain advantages. Thus where the kiln is fired by means of a powdered coal flame, the pulverulent oxychlorid composition may be easily and conveniently mixed in proper proportions with the coal and passed therewith through the grinder, thus being very intimately mixed with the resultant powdered fuel which is blown into the kiln. According to this method the oxychlorid is projected directly into the hottest part of the combustion zone in the kiln, a portion coming directly in contact with the intensely hot cement materials, while another portion remains suspended in the kiln atmosphere in intimate contact both with volatilized potash in various forms of combination and also with fine particles of ash from combustion of the fuel. The portion passing into contact with the cement materials aids directly in furthering liberation of potassium in combination with chlorin; while the portion in suspension in the kiln atmosphere serves in part to convert potassium silicate, or other comparatively refractory and insoluble forms of volatilized potash into a more soluble condition, and in part to prevent recombination of relatively soluble forms of volatilized potash with silica and other acid radicals present and largely attributable to the fuel ash, thus enhancing the percentage of "available" or readily water-soluble potash recoverable from the dust and gases of the kiln.

In another, and what I consider at present a more desirable, procedure, a suitable proportion of the calcium oxychlorid composition is added to the materials of the raw cement mix prior to feeding the same into the upper end of the inclined rotary kiln. This addition may desirably be made to the limestone and clay or other argillaceous material going into the mix before the mix is ground up, thorough incorporation of the oxychlorid composition with the other materials being thereby insured. Where the oxychlorid composition is added as a powder, it is easy to obtain a uniform distribution thereof throughout the raw mix. Satisfactory distribution is also obtained where the oxychlorid composition is added in more or less granular or lumpy condition to the unground cement materials, for in the subsequent grinding, the oxychlorid composition becomes thoroughly pulverized and mixed with sufficient uniformity. The mix being fed in at the upper end of the slowly rotating kiln it progresses slowly toward the lower end of the kiln through zones of gradually increasing temperature. The reaction between the calcium oxychlorid, magnesium oxychlorid, etc., and the combined potash present in the raw mix, begins some little time before the materials reach the clinkering zone or zone of highest temperature; and by the time the materials have reached the clinkering zone, a substantial part of their potash content has been fumed off. This elimination of potash approaches completion in the clinkering zone, although perfectly complete elimination is not attainable in actual practice. As compared to the elimination obtained by the use of calcium chlorid in amount equal by weight to the calcium chlorid hypothetically present in a given amount calcium oxychlorid composition used, however, actual tests under parallel conditions show that elimination of potash by the use of the calcium oxychlorid composition is noticeably more complete.

If desired, the calcium oxychlorid composition may be introduced into the kiln both by adding it to the raw mix and at the same time blowing it in with the fuel. Such procedure offers special advantages under some conditions.

In plants located in the eastern part of the United States the potash content of a Portland cement mix varies more or less, but commonly ranges between 0.5 per cent. and 1.5 per cent., figured as $K_2O$, with 1 per cent. a fair average. These percentages may of course be substantially raised by including feldspar or other highly potassiferous ingredient to the raw mix. The amount of calcium oxychlorid composition to be introduced into the kiln varies with the potash content of the raw mix and also with the analysis of the particular oxychlorid composition employed. The analysis of the latter varies in turn with the particular proportions and grades of lime or hydrated lime and calcium chlorid employed in its manufacture. A typical composition suitable for use in practising the invention, made from commercial grades of lime and calcium chlorid, analyzes approximately as follows:

| | |
|---|---|
| Lime (CaO) | 53.00% |
| Calcium chlorid | 31.90% |
| Magnesia (MgO), etc | 1.10% |
| Water | 14.00% |
| | 100.00% |

While in the above analysis, all the chlorin is figured in terms of calcium chlorid as a constituent of the composition, this being a convenient measure of the chlorin content, it is improbable that calcium chlorid as such exists therein to any extent, the calcium evidently being present in the form of one or more hydrated oxychlorids characteristic of a set oxychlorid cement of the Sorel type. As the composition is ordinarily made from commercial limes, varying percentages of magnesia are usually present in the form of one or more oxychlorids of magnesium or as a double oxychlorid combination with the lime. But unless the proportion of magnesia is excessively high, this has no undesirable effect on the resultant clinker in view of the fact that only a relatively small percentage of the oxychlorid composition is introduced into the kiln.

Compositions showing from 25% to 35% $CaCl_2$ by analyses like that above given, are most desirable for present purposes. Stored in ordinary closed containers such as barrels, such compositions may be kept for a long time without undergoing substantial alteration.

The amount of composition necessary to add to a raw cement mix of given potash content may be conveniently calculated on the basis of the chlorin contained in the oxychlorid composition, or on the hypothetical calcium chlorid content thereof. Most desirably a sufficient amount should be used to provide chlorin enough to combine with all or at least a major part of the potash in the mix, and in some cases to provide an excess. Thus, in a typical example, where the raw mix contains about 1 per cent. potash, figured as $K_2O$, an amount of the oxychlorid composition whose analysis is given above, equal to about 2 or 3 per cent. by weight of the raw cement materials, may desirably be incorporated in the finely ground mix fed to the kiln. These percentages are lower than that equivalent theoretically to the total potash in the mix; but they are found satisfactory in practice, owing as I believe to the peculiarly efficient liberating action of the oxysalt composition, such action being probably due in part to the tenacity with which its combined water is retained even at comparatively high temperatures, which enables such water to act catalytically under the most favorable conditions. Smaller or greater proportions than those mentioned may be used, but substantially smaller proportions than are recommended in the above specific example, ordinarily do not give as thoroughly satisfactory liberation and recovery of potash; while larger proportions do not appear to offer proportionately increased advantages and, though without detrimental effect, they are sometimes undesirable from the standpoint of economical operation. An addition of from 1 to 5 per cent. of the raw mix by weight will usually be found to be a satisfactory working rule with cement materials of the character described.

The volatilized potash values leaving the kiln with the dust and gases may be recovered in any known or suitable manner, as by simple subsidence, passage through filters either wet or dry, or both, to remove such suspended and condensable matter as yields to mechanical methods of dust and fume separation; these mechanical methods being most desirably supplemented or replaced wholly or in part by passage of the gases through electrical treaters or dust precipitating systems, of which the well known Cottrell system is sufficiently typical. The material recovered in settling chambers, filters, electrical treaters, etc., may be disposed of as such, if its potash content is sufficiently high to be used by fertilizer manufacturers, for example. Or the precipitated dust and fume may be leached to remove soluble potassium salts which can be further purified and separated one from another by well known or suitable methods of evaporation and crystallization.

As compared to the use of common salt (NaCl) in the recovery of potash in Portland cement manufacture, a calcium oxychlorid composition such as that above described offers the advantage, among others, that the fume and gases going to the electrical treaters (where used) are in very much better condition for electrical treatment and the percentage of potash recovery is therefore greater. Where common salt is used as the liberating agent, large quantities of the salt are volatilized as such and carried out of the kiln into the treaters, where the salt condenses on the precipitating apparatus, forming a layer which reduces the efficiency of the treaters and which necessitates more or less frequent shutdowns for the purpose of cleaning out the system. Furthermore, use of a considerable excess of oxychlorid composition adds nothing detrimental to the cement clinker; whereas with common salt, although additions of 1 to 1¼ per cent. actually serve to reduce the total alkali in the clinker, additions of 2 per cent. or more tend to increase alkali in the clinker.

While the process has been hereinbefore described more particularly with reference to its application in the cement industry, it is to be understood, as previously stated, that the invention also comprises in its broader aspects any method of reacting upon a potassiferous material, and particularly potassiferous minerals, with an oxysalt, such as oxychlorid, or with an oxysalt composition as distinguished from a single definite oxysalt compound in pure form. Other oxysalts which can be employed either separately or in mixture with each other, or with an oxychlorid, are oxysulfates and oxyphosphates, for example. These latter salts can advantageously be employed under certain conditions, and especially where a less readily volatile acid radical than chlorin is required. Oxysalts of calcium accompanied by oxysalts of magnesium in mixtures of the character above described, are especially desirable as a rule; but oxysalts of the other alkaline earth metals, and of earth metals generally, such as magnesium and zinc, for example, are useful in varying degree in special applications of my novel process.

Another type of oxysalt composition, which has some decided advantages especially adapting it for use in practising my invention may be prepared by treating natural brines, or the residual mother liquors from salt manufacture commonly known as bitterns, with an excess of caustic lime or hydrated lime in proportions to produce a set oxysalt composition such liquors usually contain varying proportions of chlorids of calcium, magnesium, sodium, etc., sometimes accompanied by bromids, iodids, sulfates, etc. By utilizing liquors of this kind, mixed oxysalt compositions are easily and cheaply prepared which are very effective when employed as potash-liberating agents in accordance with the present invention, and for other purposes.

In another form which the invention may take, a potassiferous mineral, such as feldspar or the like, in finely ground condition, may be mixed with a suitable proportion of an oxysalt, such as an oxychlorid of calcium, in conjunction or not with calcium carbonate, calcium sulfate, and other ingredients useful in this connection, and the mixture may be heated sufficiently to bring about the desired liberating reaction upon the potash content of the mineral without fusion of the mass and without extensive volatilization of potash; the mass being subsequently leached, if it is desired to recover potash salts as such, or simply utilized for fertilizer or other purposes without separating the potash salts. On the other hand, the heating may be carried sufficiently high to fume off potash, which can be recovered in any suitable manner, the residue being suitable for use in the manufacture of Portland or other cement, if the proportions of the original mixture have been properly calculated for that purpose.

In the foregoing description and in the appended claims, the terms oxysalt, oxychlorid, etc., of calcium or other metal are to be understood as covering broadly both the mentioned compounds as such, and also mixtures of such compounds with each other and with other compounds.

What I claim is:

1. The process of treating potassiferous materials to render their potash content more available, which comprises reacting upon potassiferous material by means of a set cement composition of the Sorel type added thereto.

2. The process of treating potassiferous materials to render their potash content more available, which comprises mixing a set cement composition of the Sorel type, comprising an oxysalt of calcium with potassiferous material, and subjecting the mixture to reacting conditions.

3. The process of treating potassiferous mineral matter to render its potash content more available which comprises mixing such mineral matter with a set cement composition of the Sorel type, comprising an alkaline earth oxysalt of an acid with which potassium forms a relatively soluble compound, and heating the mixture to a reacting temperature.

4. The process of treating potassiferous mineral matter which comprises mixing such mineral matter with a comminuted set cement composition comprising an oxychlorid of calcium, heating the mixture to a potash-volatilizing temperature, and recovering volatilized potash.

5. The process of treating potassiferous mineral matter which comprises mixing therewith a set cement composition comprising a basic compound of lime and chlorin, and heating the mixture to convert its potash content into a more soluble form.

6. The process of treating potassiferous mineral matter which comprises mixing therewith a substantially dry hydrated material comprising an oxychlorid of calcium, heating the mixture to volatilize potash therefrom, and collecting volatilized potash.

7. The process of treating potassiferous materials to render their potash content more available which comprises reacting upon potassiferous material with a mixture of several oxysalts.

8. The process of treating potassiferous materials to render their potash content more available which comprises mixing with potassiferous material a composition containing several oxyhalids of calcium, and heating the mixture to a reacting temperature.

9. The process of treating potassiferous materials to render their potash content more available which comprises mixing with potassiferous material an oxysalt composition resulting from the treatment of a bittern with an excess of an alkaline earth base, and heating the mixture to a reacting temperature.

10. The process of obtaining potash in the manufacture of Portland cement, which comprises incorporating in a potassiferous Portland cement mix a set oxysalt composition capable of assisting potash liberation, burning the mix to clinker in an inclined rotary kiln, and collecting potash values in the dust and gases leaving the kiln.

11. The process of obtaining potash in the manufacture of Portland cement, which comprises incorporating in a potassiferous Portland cement mix a set composition of the Sorel type comprising an oxychlorid of calcium, burning the mix to clinker in an inclined rotary kiln, and treating the effluent dust and gases for recovery of potash values.

12. The process of obtaining potash in the manufacture of Portland cement, which comprises incorporating in a potassiferous Portland cement mix a pulverulent material comprising an oxychlorid of calcium of the character described, the amount added being from about 1 to 5 per cent. of the weight of the raw mix, burning the mix to clinker, and collecting potash values in the dust and gases leaving the kiln.

13. The process of obtaining potash in the manufacture of Portland cement from potassiferous raw materials, which comprises introducing into the cement kiln a relatively small proportion of a substantially dry pulverulent calcium oxychlorid composition in reactive relation to the cement mix, clinkering the mix, and collecting potash values in the dust and gases leaving the kiln.

14. The process of obtaining potash in the manufacture of Portland cement from potassiferous materials, which comprises incorporating in the raw Portland cement mix a relatively small proportion of a substantially dry pulverulent material comprising a hydrated oxychlorid of calcium, clinkering the mix in a suitable kiln and collecting potash values in the dust and gases leaving the kiln.

15. The process of obtaining potash in the manufacture of Portland cement from potassiferous materials, which comprises incorporating in the raw Portland cement mix a relatively small proportion of an oxysalt, firing the kiln with a pulverulent fuel containing a small proportion of an admixed potash-liberating agent, and collecting potash values in the dust and gases leaving the kiln.

16. The process of obtaining potash in the manufacture of Portland cement from potassiferous materials, which comprises incorporating in the raw Portland cement mix a relatively small proportion of a calcium oxychlorid composition, firing the kiln with powdered coal containing a small proportion of said calcium oxychlorid composition mixed therewith, and collecting potash values in the dust and gases leaving the kiln.

17. The process of obtaining potash in the manufacture of Portland cement which comprises burning a potassiferous cement mix to clinker, in the presence of a plurality of oxysalts, and recovering resultant liberated potash values.

18. The process of obtaining potash in the manufacture of Portland cement which comprises mixing with potassiferous cement materials a composition resulting from the treatment of a natural brine or a bittern with an excess of lime, burning the mixture to clinker, and recovering volatilized potash values.

In testimony whereof I hereunto affix my signature.

CHARLES CATLETT.